(12) United States Patent
Machida (10) Patent No.: US 9,164,457 B2
(45) Date of Patent: Oct. 20, 2015

(54) IMAGE FORMING DEVICE, IMAGE FORMING METHOD AND COMPUTER READABLE MEDIUM

(75) Inventor: Masahiro Machida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 345 days.

(21) Appl. No.: 13/035,191

(22) Filed: Feb. 25, 2011

(65) Prior Publication Data

US 2012/0044518 A1 Feb. 23, 2012

(30) Foreign Application Priority Data

Aug. 23, 2010 (JP) ................................ 2010-186699

(51) Int. Cl.
*G06F 15/00* (2006.01)
*G03G 15/00* (2006.01)
*G06K 15/00* (2006.01)

(52) U.S. Cl.
CPC .......... *G03G 15/5075* (2013.01); *G03G 15/502* (2013.01); *G06K 15/002* (2013.01); *G03G 2215/00109* (2013.01)

(58) Field of Classification Search
None
See application file for complete search history.

(56) References Cited

U.S. PATENT DOCUMENTS

| 6,657,534 B1* | 12/2003 | Beer et al. ...................... 340/3.1 |
| 2005/0179931 A1* | 8/2005 | Yamaguchi et al. ......... 358/1.14 |
| 2005/0213135 A1* | 9/2005 | Asai et al. .................... 358/1.13 |
| 2006/0028661 A1* | 2/2006 | Uruma ........................... 358/1.6 |
| 2006/0047481 A1 | 3/2006 | Kanai |
| 2006/0077413 A1* | 4/2006 | Lum et al. ..................... 358/1.13 |
| 2006/0253548 A1* | 11/2006 | Vitanov et al. ................ 709/217 |
| 2006/0268320 A1* | 11/2006 | Bridges et al. ............... 358/1.15 |
| 2007/0139689 A1* | 6/2007 | Maruyama .................... 358/1.14 |
| 2007/0216913 A1* | 9/2007 | Toda .............................. 358/1.1 |
| 2007/0216929 A1* | 9/2007 | Motoyama ................... 358/1.13 |
| 2007/0279678 A1* | 12/2007 | Kobayashi ................... 358/1.15 |
| 2008/0068643 A1* | 3/2008 | Yasunaga ..................... 358/1.15 |
| 2008/0072000 A1* | 3/2008 | Osaki et al. ................... 711/162 |
| 2008/0130043 A1* | 6/2008 | Lunetta et al. ............... 358/1.15 |
| 2008/0133179 A1 | 6/2008 | Kanai |
| 2008/0189781 A1* | 8/2008 | Pathak et al. .................. 726/12 |
| 2009/0073487 A1* | 3/2009 | Li ................................. 358/1.15 |
| 2009/0106088 A1* | 4/2009 | Vanska et al. .................. 705/10 |
| 2009/0106132 A1* | 4/2009 | Isturiz et al. ................... 705/34 |

(Continued)

FOREIGN PATENT DOCUMENTS

JP 2002252732 A 9/2002
JP 2003150360 A 5/2003

(Continued)

OTHER PUBLICATIONS

Communication dated Jul. 22, 2014, from the Japanese Patent Office in counterpart Japanese Application No. 2010186699.

*Primary Examiner* — Helen Q Zong
(74) *Attorney, Agent, or Firm* — Sughrue Mion, PLLC (57) ABSTRACT

An image forming device provided with a restart unit and a deletion unit. If processing requiring a restart of the image forming device is requested by another terminal device that is connected via a communications circuit, the restart unit causes the image forming device to restart. If the processing requiring the restart is requested by the other terminal device while a service process relating to image processing is being provided by a service process provision device that is connected via the communications circuit, the deletion unit deletes data relating to use of the service process before the image forming device is restarted.

23 Claims, 5 Drawing Sheets

(56) References Cited

U.S. PATENT DOCUMENTS

| | | | |
|---|---|---|---|
| 2009/0195815 A1* | 8/2009 | Naito et al. | 358/1.15 |
| 2009/0307195 A1* | 12/2009 | Anno | 707/3 |
| 2010/0024036 A1* | 1/2010 | Morozov et al. | 726/26 |
| 2010/0027041 A1* | 2/2010 | Kanno | 358/1.13 |
| 2010/0058321 A1* | 3/2010 | Anderson et al. | 717/173 |
| 2010/0141980 A1* | 6/2010 | Ito | 358/1.14 |
| 2010/0293547 A1* | 11/2010 | Hayami | 718/102 |
| 2011/0022505 A1* | 1/2011 | Kino | 705/34 |
| 2011/0179264 A1* | 7/2011 | Desselle et al. | 713/2 |
| 2011/0238517 A1* | 9/2011 | Ramalingam et al. | 705/26.1 |
| 2011/0299117 A1* | 12/2011 | Hashimoto | 358/1.15 |
| 2011/0317207 A1* | 12/2011 | Shimizu | 358/1.15 |
| 2012/0166481 A1* | 6/2012 | Dittrich | 707/770 |

FOREIGN PATENT DOCUMENTS

| | | |
|---|---|---|
| JP | 2005151010 A | 6/2005 |
| JP | 2006-086642 A | 3/2006 |
| JP | 2007026412 A | 2/2007 |
| JP | 2007148620 A | 6/2007 |

* cited by examiner

IMAGE FORMING DEVICE, IMAGE FORMING METHOD AND COMPUTER READABLE MEDIUM

CROSS-REFERENCE TO RELATED APPLICATION

This application is based on and claims priority under 35 USC 119 from Japanese Patent Application No. 2010-186699 filed on Aug. 23, 2010.

BACKGROUND

1. Technical Field

The present invention relates to an image forming device and an image forming program.

2. Related Art

There is a conventional technology in which a web page is transmitted to a terminal device of the image forming device.

SUMMARY

An invention relating to a first aspect of the present invention is an image forming device including: a restart unit that causes the image forming device to restart if processing for which a restart of the image forming device is required is requested by another terminal device connected via a communications circuit; and a deletion unit that, if the processing for which the restart is required is requested by the another terminal device when a service process relating to image processing is being provided by a service process provision device connected via the communications circuit, deletes data relating to use of the service process before the image forming device is restarted.

BRIEF DESCRIPTION OF THE DRAWINGS

Exemplary embodiments of the present invention will be described in detail based on the following figures, wherein.

DETAILED DESCRIPTION

Herebelow, exemplary embodiments of the present invention are described.

First Exemplary Embodiment

Figure 1:
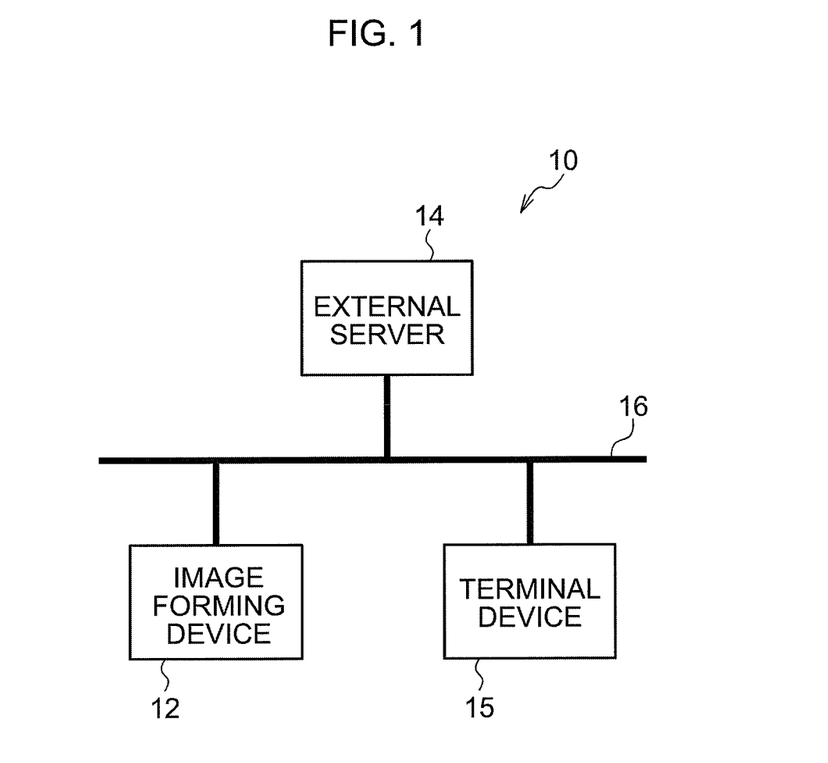
FIG. 1 is a schematic structural diagram of an image forming system.

FIG. 1 illustrates a schematic configuration of an image forming system 10 relating to the present exemplary embodiment. As shown in FIG. 1, the image forming system 10 has a configuration in which an image forming device 12, an external server 14 and a terminal device 15 are connected to one another through a network 16.

Figure 2:
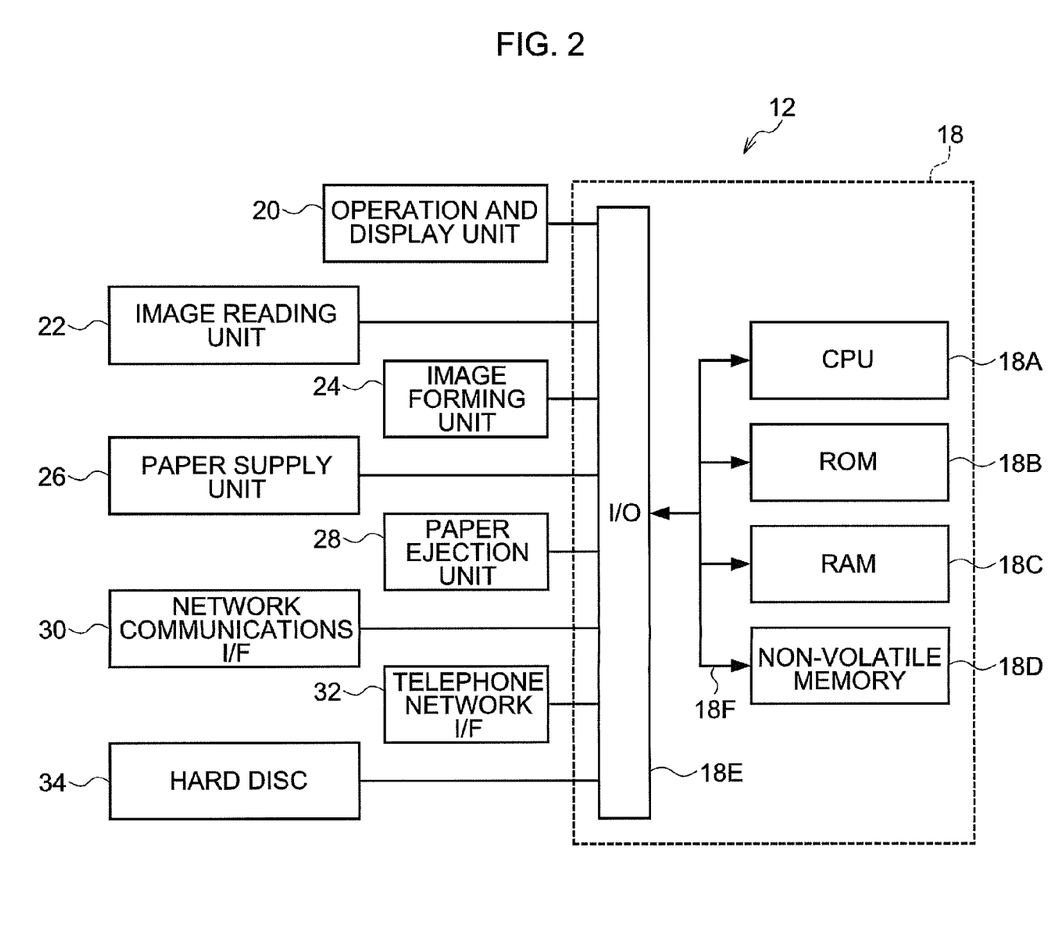
FIG. 2 is a schematic structural diagram of an image forming device.

FIG. 2 illustrates a schematic configuration of the image forming device 12. As shown in FIG. 2, the image forming device 12 includes a computer 18.

The computer 18 has a configuration in which a central processing unit (CPU) 18A, a read-only memory (ROM) 18B, a random access memory (RAM) 18C, a non-volatile memory 18D and an input/output interface (I/O) 18E are respectively connected through a bus 18F.

Functional units, such as an operation and display unit 20, an image reading unit 22, an image forming unit 24, a paper supply unit 26, a paper ejection unit 28, a network communications interface (I/F) 30, a telephone network interface (I/F) 32, a hard disc 34 and suchlike, are connected to the I/O 18E.

The operation and display unit 20 includes, for example, various buttons and a touch panel or the like. The various buttons include a start button for instructing the start of copying and the like, and a ten-key pad and the like. The touch panel displays various screens, such as a settings screen, states of the device and the like. The settings screen is for setting various image forming conditions, such as a copying density and the like, parameters of service processes provided by the external server 14, and the like.

The image reading unit 22 includes an image reading sensor such as a line CCD or the like, a scanning mechanism for scanning the image reading sensor, and the like. The image reading section 22 reads images of original documents that are placed on the device.

The image forming unit 24 forms an image on a recording medium by, for example, an electrophotography system. Specifically, the image forming unit 24 includes a charging device, an exposure device, a developing device, a transfer device and a fixing device, or the like. The charging device is for charging up a photoreceptor drum. The exposure device forms an electrostatic latent image, corresponding to an image, on the photoreceptor drum by exposing light onto the charged photoreceptor drum in accordance with the image. The developing device develops the electrostatic latent image formed on the photoreceptor drum with a toner. The transfer device transfers the toner image corresponding to the image that has been formed on the photoreceptor drum onto the recording medium. The fixing device fixes the transferred toner image corresponding to the image to the recording medium.

The exposure device may be an optical scanning device, which is configured to include an optical system such as a semiconductor laser, a rotating polygon mirror, a collimator lens, a cylindrical lens and an f-θ lens, or the exposure device may be an LED head formed with a plural number of LEDs or the like.

The paper supply unit 26 includes a paper accommodation section in which recording paper is accommodated and a supply mechanism that supplies recording paper from the paper accommodation section to the image forming unit 24, or the like.

The paper ejection unit 28 includes a catch portion and an ejection mechanism, or the like. The recording paper is ejected to the catch portion, and the ejection mechanism is for ejecting the recording paper on which an image has been formed by the image forming unit 24 onto the catch portion.

The network communications I/F 30 is an interface for implementing data communications with the external server 14 via the network 16.

The telephone network I/F 32 is an interface for implementing facsimile communications with another image forming device connected via the telephone network, which is not illustrated.

The hard disc 34 stores, for example, log data of conditions, operating states and the like of the respective sections of the device, log data of processing results of copies, facsimile communications, prints and the like, various kinds of settings data, a control program and so forth.

In the present exemplary embodiment, as an example, a control program whose processing is described below is stored in advance in the hard disc 34. The CPU 18A reads the control program stored in advance and hence executes the program. The control program may be recorded on a recording medium such as a CD-ROM or the like and executed consequent to being read by a CD-ROM drive or the like.

Figure 3:
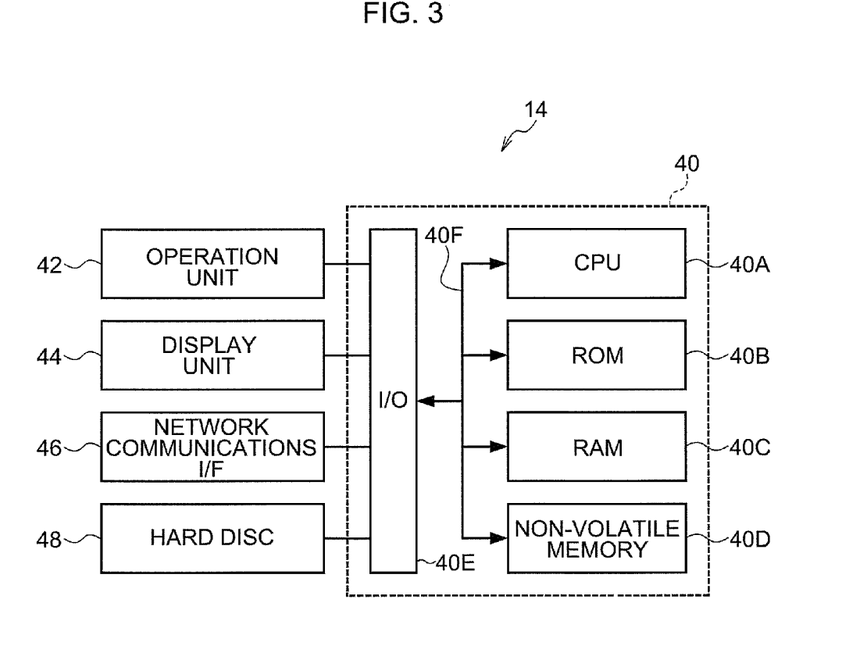
FIG. 3 is a schematic structural diagram of an external server.

FIG. 3 illustrates a schematic configuration of the external server 14. As illustrated in FIG. 3, the external server 14 includes a computer 40.

The computer 40 has a configuration in which a CPU 40A, a ROM 40B, a RAM 40C, a non-volatile memory 40D and an input/output interface (I/O) 40E are respectively connected through a bus 40F.

The I/O 40E is connected to an operation unit 42, a display unit 44, a network communications interface (I/F) 46, a hard disc 48 and the like. The operation unit 42 includes a keyboard and a mouse or the like. The display unit 44 is structured with a liquid crystal display or the like. The network communications I/F 46 is for communicating data with the image forming device 12 via the network 16. The hard disc 48 is for storing an application program and the like. The application program is for executing an application that serves as a service process to be provided to other devices such as, for example, the image forming device 12 and the like (for example, a Web application).

The external server 14 provides various service processes relating to image formation processing to other devices connected to the network 16. The service processes relating to image formation processing include scan-to-OCR, scan-to-mail and the like. Scan-to-OCR applies optical character recognition (OCR) processing to, for example, image data scanned by the image forming device 12. Scan-to-mail sends, for example, image data scanned by the image forming device 12 by e-mail to specified e-mail addresses.

When the external server 14 provides the various service processes to the image forming device 12, the external server 14 carries out billing processing in accordance with the types and details of the provided service processes. Beside usage fees corresponding to details of use of applications provided by the external server 14, categories of billing include, for example, communication fees that are billed in accordance with durations of connections to the external server 14, that is, durations of use of the applications, and the like. At least one fee is to be included.

The terminal device 15 is configured with, for example, an ordinary personal computer or the like. The terminal device 15 makes requests to the image forming device 12 for, for example, changes in various settings of the image forming device 12. At such a time, if a change in system data for which a restart of the image forming device 12 is required, for example, a change in authentication settings data relating to user authentication or the like, is requested, then the image forming device 12 restarts. This data for which a restart is required is an example and is not to be limiting.

Next, as operation of the present exemplary embodiment, processing that is executed by the image forming device 12 is described with reference to a flowchart.

Figure 4:
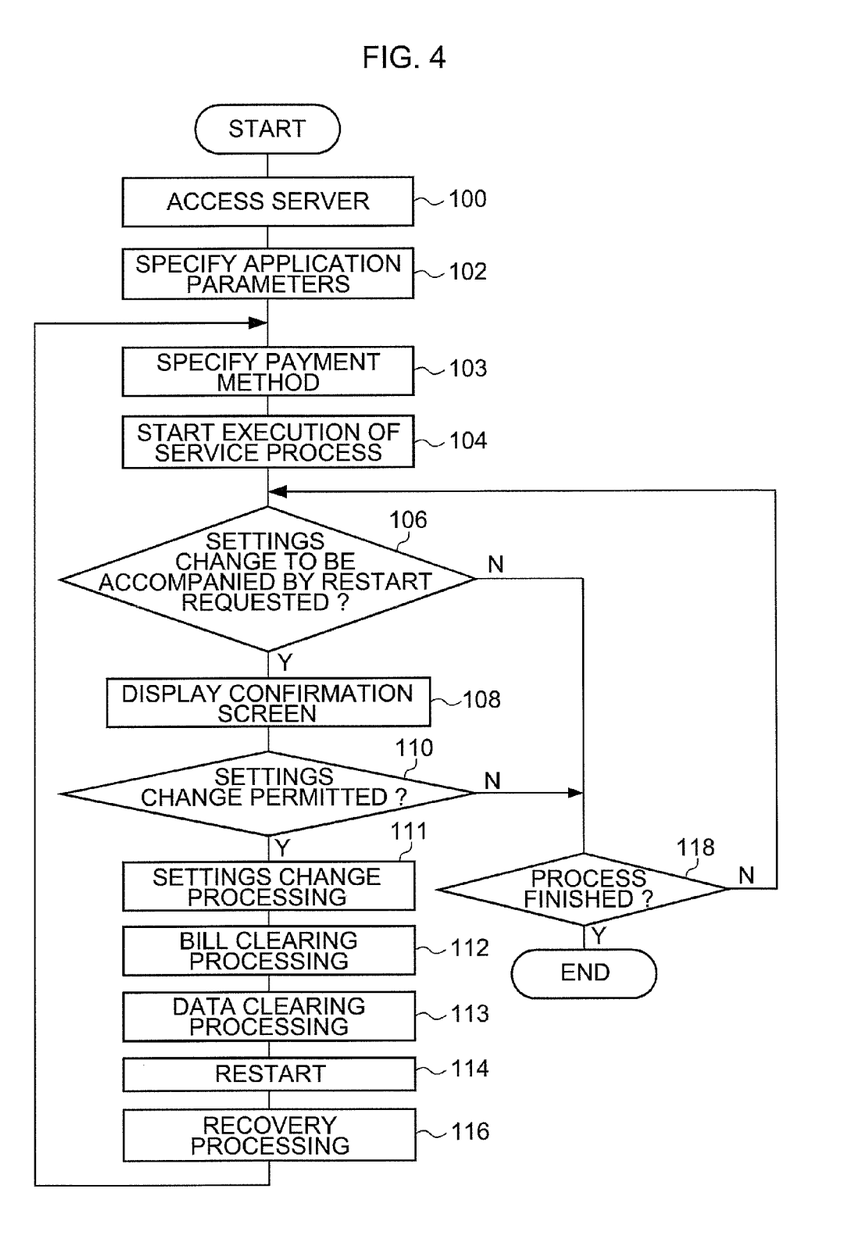
FIG. 4 is a flowchart of processing that is executed by the image forming device, relating to a first exemplary embodiment.

FIG. 4 shows a flowchart illustrating an example of processing that is executed by the image forming device 12. This processing is executed in a state in which a user has inputted a user ID and password or the like at the image forming device 12 and user authentication has been completed, and the user has operated the operation and display unit 20 to instruct execution of a service process to be provided by the external server 14. For the present exemplary embodiment, a case is described in which the user has instructed execution of the above-mentioned scan-to-OCR.

Firstly, in step 100, the image forming device 12 accesses the external server 14. That is, the image forming device 12 makes a request to the external server 14 for execution of the scan-to-OCR instructed by the user. At this time, data for identifying the user such as the user ID or the like, data such as a process ID that is provided for each service process, and the like are transmitted to the external server 14.

In response, the external server 14 executes a scan-to-OCR application program, and makes a request to the image forming device 12 to specify parameters for the application.

Here, the parameters of scan-to-OCR include but are not to be limited to, for example, the resolution of a scan, the size of an image to be scanned, a save location of the scanned image, a type of OCR processing, and the like.

In step 102, in response to the request from the external server 14, the image forming device 12 displays a settings screen at the operation and display unit 20 for specifying various parameters for when the scan-to-OCR is executed, and permits the user to input the parameters. The image forming device 12 transmits the inputted parameters to the external server 14 and also stores the inputted parameters in the hard disc 34.

In step 103, a settings screen for specifying a payment method is displayed at the operation and display unit 20, and a payment method is specified by the user. In the present exemplary embodiment, as an example, a case in which payment by credit card is specified is described. At this time, payment data required for a payment is inputted, such as a credit card number and personal name or the like. The image forming device 12 transmits the inputted data to the external server 14 and also stores the inputted data in the hard disc 34.

In step 104, execution of the service process begins. The user places the document to be scanned on the image forming device 12, and operates the operation and display unit 20 to instruct reading of the image. Accordingly, reading of the image is commenced by the image reading unit 22 of the image forming device 12, and image data of the image that is read is sequentially transmitted to the external server 14. At the external server 14, OCR processing is sequentially applied to the image data transmitted from the image forming device 12, and the OCR-processed data is saved to the designated save location.

In step 106, the image forming device 12 determines whether or not a change in settings such as system data or the like for which a restart of the image forming device 12 is required, a change in settings that affects execution of a service process that is being processed or a service process that is scheduled for subsequent execution or the like, or the like has been requested by the terminal device 15. If such a settings change has been requested by the terminal device 15, the image forming device 12 proceeds to step 108, and if such a settings change has not been requested by the terminal device 15, the image forming device 12 proceeds to step 118.

In step 118, the image forming device 12 determines whether or not the scan-to-OCR processing has finished. That is, it is determined whether or not reading of the placed original has finished, the image data of the read image has been transmitted to the external server 14, and OCR processing at the external server 14 has finished. This is judged by, for example, whether or not data signifying that the processing has finished has been received from the external server 14.

Then, if the scan-to-OCR processing has ended, the present routine ends. While the scan-to-OCR processing has not ended, the image forming device 12 returns to step 106.

On the other hand, if a settings change has been requested by the terminal device 15, in step 108, an unillustrated confirmation screen is displayed at the operation and display unit 20 in order to confirm whether or not the settings change is permitted. The user chooses whether or not to permit the settings change in this confirmation screen.

In step 110, it is determined whether or not the settings change has been permitted by the user. If the settings change is permitted, the image forming device 12 proceeds to step 111, and if the settings change is not permitted, the image forming device 12 proceeds to step 118.

In step 111, the settings change processing requested by the terminal device 15 is executed, and the image forming device 12 proceeds to step 112.

In step 112, bill clearing processing for clearing (deleting) billing data that has been billed hitherto is executed. Specifically, a bill clear command containing data required for clearing a bill, such as the user ID and the process ID or the like, is transmitted to the external server 14, and a request is made to clear fees that have been charged up to this point.

In response, at the external server 14, billing data that has been billed hitherto for the service process with the designated process ID is cleared. For example, if the user specified execution of a scan-to-OCR process for a 100-page original document and a settings change associated with a restart is requested by the terminal device 15 at a point at which reading and OCR processing of 50 pages of the document has been completed, the scan-to-OCR processing of the 50 pages has already been billed. Therefore, the billing data for these 50 pages is cleared. If a communication fee has also been charged, this communication fee is also cleared.

If billing processing is also executed at the image forming device 12, this billing data is also cleared.

In step 113, data clearing processing for clearing (deleting) payment data is executed. Specifically, a data clear command instructing that payment data such as a card number and the like be cleared is transmitted to the external server 14, and a request is made for the payment data to be deleted.

In response, at the external server 14, the payment data that has been stored in the hard disc 48 is deleted. At the image forming device 12 too, the payment data that has been stored in the hard disc 34 is deleted.

Then, when the data clearing processing has been executed, in step 114, the image forming device 12 is restarted. The image forming device 12 may be restarted after data that deletion has been completed is received from the external server 14. In addition, the image forming device 12 may be notified by the external server 14 of what data has been subjected to deletion.

After the image forming device 12 has been restarted, in step 116, recovery processing is executed. Specifically, a message indicating that the bill has been cleared and that the payment data has been cleared is displayed at the operation and display unit 20. Thus, the user knows that the billing data and payment data have been cleared. Displaying this message after the restart is not a limitation; the message may be displayed before the restart or during the deletion processing (for example, while the billing data is being cleared or the like).

In addition, the image forming device 12 reads the parameters that were specified in step 102 from the hard disc 34, transmits the parameters to the external server 14, and performs the restart. Therefore, the user may be provided with the service process again without specifying the parameters again. After the recovery processing has been executed, the image forming device 12 proceeds to step 103 and repeats the processing described above. The recovery processing is carried out only if a user authenticated by user authentication at the time of the restart is the user who started the service process that is being processed. If the authenticated user is another user, the recovery processing need not be carried out.

Thus, if a settings change requiring a restart is requested by the terminal device 15 when a service process is being provided by the external server 14, the restart is carried out with a bill being cleared. Thus, unnecessary billing of a user is prevented. Moreover, because the restart is carried out with payment data such as a credit card number and the like being deleted, personal data is prevented from being left unnecessarily stored in the external server 14.

In the present exemplary embodiment, a case is described in which a confirmation screen is displayed in step 108 in order to confirm whether or not to permit a restart and the restart is carried out only if the restart is permitted by the user. However, a restart may be carried out without displaying a confirmation screen, that is, without obtaining permission for the restart from a user.

Furthermore, the processing of only one or other of the bill clearing processing of step 112 and the data clearing processing of step 113 may be executed.

The processing may return to step 100 and be executed from the beginning without the recovery processing of step 116 being executed.

Second Exemplary Embodiment

Next, a second exemplary embodiment of the present invention is described. Herein, portions that are the same as in the first exemplary embodiment are assigned the same reference numerals, and detailed descriptions thereof are not given.

The image forming system relating to the present exemplary embodiment is the same as the image forming system 10 described in the first exemplary embodiment, so is not described.

Next, as operation of the present exemplary embodiment, processing that is executed by the image forming device 12 is described with reference to the flowchart illustrated in FIG. 5.

Figure 5:
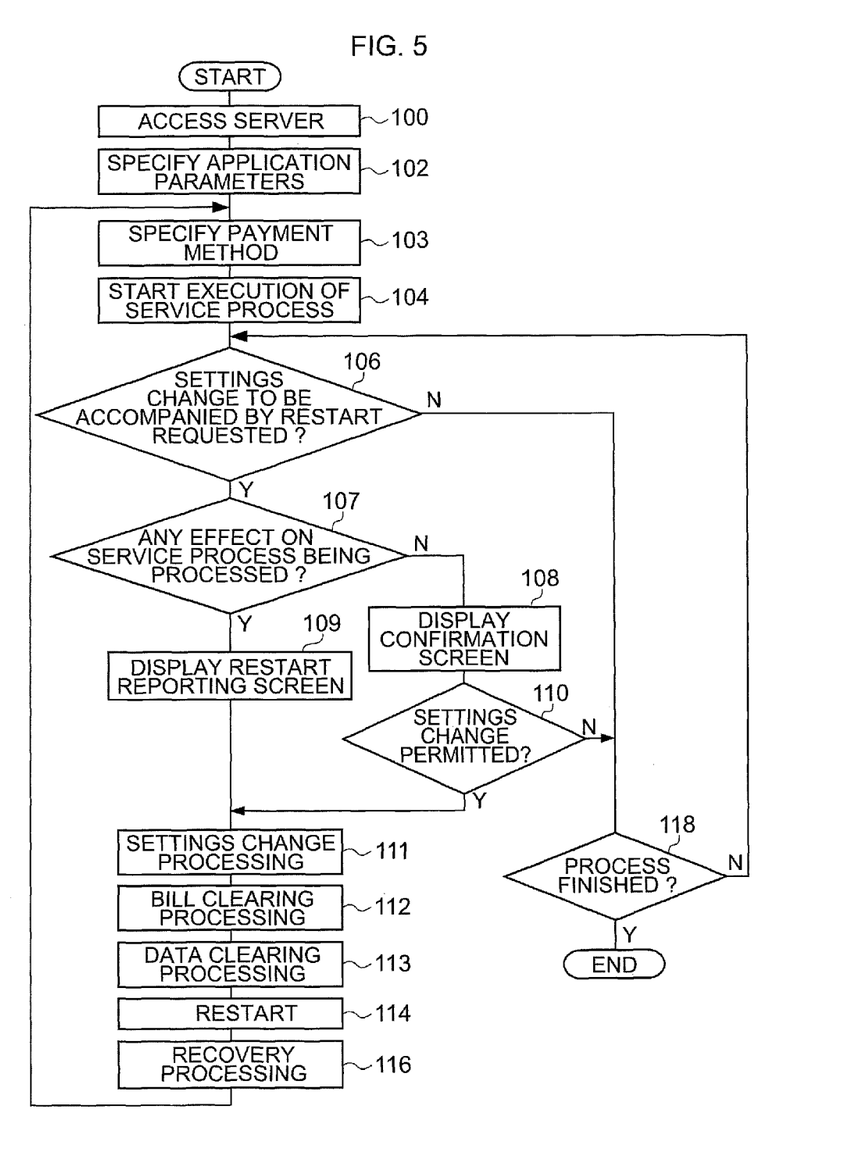
FIG. 5 is a flowchart of processing that is executed by the image forming device, relating to a second exemplary embodiment.

The flowchart illustrated in FIG. 5 differs from the flowchart of FIG. 4 described in the first exemplary embodiment in respect of the processing of steps 107 and 109. The processing of other steps is the same as in FIG. 4, so is not described.

If the determination of step 106 is positive, then in step 107 it is determined whether or not the settings change requiring a restart that is requested by the terminal device 15 is a settings change that has an effect on execution of the service process that is being processed or a service process that is scheduled for subsequent execution or the like (for example, a setting of restrictions on settings parameters of the image reading unit 22, an update of billing data of services provided by the external server 14 such as OCR processing and the like, or the like).

If the settings change requiring a restart that is requested by the terminal device 15 is a settings change that has an effect on execution of the service process that is being processed or a service process that is scheduled for subsequent execution or the like, the image forming device 12 proceeds to step 109.

In step 109, a restart reporting screen that indicates that a restart is to be carried out is displayed at the operation and display unit 20. In the restart reporting screen, a message along the lines of, for example, "This device is being restarted because billing data changed during your task. The billing record of the current task is being deleted." is displayed. Thereafter, restart processing and the like is executed in the same manner as in the first exemplary embodiment.

Thus, if the settings change requiring a restart that is requested by the terminal device 15 is a settings change that affects execution of the service process that is being processed or a service process that is scheduled for subsequent execution or the like, the image forming device 12 is restarted forcibly.

On the other hand, if the settings change requiring a restart that is requested by the terminal device 15 is a settings change that does not affect execution of the service process that is being processed or a service process that is scheduled for subsequent execution or the like, the image forming device 12 proceeds to step 108, and the confirmation screen is displayed at the operation and display unit 20 in order to confirm whether or not the settings change is permitted, in the same manner as in the first exemplary embodiment.

Then, if the user permits the settings change, the determination of step 110 is positive and the restart processing and the like is executed in the same manner as in the first exemplary embodiment. Here, rather than the restart processing being carried out immediately, the restart may be carried out after the service process currently being processed has ended.

Herein, the configuration of the image forming device 12 described in the above exemplary embodiments (see FIG. 2) is an example. Portions that are not required may be removed and new portions may be added, within a technical scope not departing from the spirit of the present invention.

Furthermore, the flows of processing of the control program described in the above exemplary embodiments (see FIG. 4 and FIG. 5) are also examples. Unnecessary steps may be removed, new steps may be added, and the sequences of processing may be rearranged, within a technical scope not departing from the spirit of the present invention.

What is claimed is:

1. An image forming device comprising:
   an image forming device;
   a terminal device configured to be connected to the image forming device via a communication circuit, the terminal device being configured to request processing for which restart of the image forming device is required;
   a service process provision device configured to be connected to the image forming device via the communication circuit, the service process provision device being configured to provide a service process relating to image processing to the image forming device, wherein
   the image forming device includes:
      a transmit unit configured to transmit a request to execute the service process and data relating to use of the service process to the service process provision server, the data including at least one of billing data and personal data;
      a restart unit configured to cause the image forming device to restart in response to the terminal device requesting the processing for which a restart of the image forming device is required; and
      a deletion unit configured to, in response to the terminal device requesting the processing for which the restart is required when the service process relating to image processing is being provided by the service process provision device, transmit a request to clear the data to the service process provision server before the image forming device is restarted in order to prevent the data from being transmitted by the communications circuit.

2. The image forming device according to claim 1, further comprising a restart reporting screen display unit configured to, if the terminal device requests the processing for which the restart is required when the service process relating to image processing is being provided by the service process provision device, and the process for which the restart is required is processing that affects execution of the service process being provided by the service provision device, display a restart reporting screen in order to report that the image forming device is to be restarted,
   wherein the restart unit is configured to cause the image forming device to restart after display of the restart reporting screen.

3. The image forming system according to claim 1, further comprising a confirmation screen display unit configured to, if the terminal device requests the processing for which the restart is required when the service process relating to image processing is being provided by the service process provision device, and the process for which the restart is required is processing that does not affect execution of the service process being provided by the service process provision device, display a confirmation screen in order to confirm whether or not the restart is permitted,
   wherein the restart unit is configured to cause the image forming device to restart if the restart is permitted at the confirmation screen.

4. The image forming system according to claim 2, further comprising a confirmation screen display unit configured to, if the terminal device requests the processing for which the restart is required when the service process relating to image processing is being provided by the service process provision device, and the process for which the restart is required is processing that does not affect execution of the service process being provided by the service process provision device, display a confirmation screen in order to confirm whether or not the restart is permitted,
   wherein the restart unit is configured to cause the image forming device to restart if the restart is permitted at the confirmation screen.

5. The image forming system according to claim 3, wherein the restart unit is configured to cause the image forming device to restart after completion of the service process being provided by the service process provision device.

6. The image forming system according to claim 1, further comprising a display unit configured to, if the terminal device requests the processing for which the restart is required when the service process relating to image processing being provided by the service process provision device, display a confirmation screen in order to confirm whether or not the restart is permitted,
   wherein the deletion unit is configured to delete data relating to use of the service process if the restart is permitted at the confirmation screen.

7. The image forming system according to claim 1, further comprising a restoration unit configured to, after the image forming device has been restarted by the restart unit, restore a state of connection with the service process provision device.

8. The image forming system according to claim 2, further comprising a restoration unit configured to, after the image forming device has been restarted by the restart unit, restore a state of connection with the service process provision device.

9. An image forming method comprising for an image forming system including an image forming device; a terminal device connected to the forming device via a communication circuit that requests processing for which a restart of the image forming device is required; a service process provision device connected to the image forming device via communication circuit that provides a service process relating to image processing to the image forming device, the image forming method comprising:
   transmitting a request to execute the service process and data relating to use of the service process to the service process provision server, the data including at least one of billing data and personal data;

restarting the image forming device if processing for which a restart of the image forming device is required is requested by the terminal device; and transmitting a request to clear the data to the service process provision server before the image forming device is restarted, if the processing for which the restart is required is requested by the terminal device when a service process relating to the image processing is being provided by the service process provision device connected via the communications circuit.

10. The image forming method according to claim 9, further comprising:

if the terminal device requests the processing for which the restart is required when the service process relating to image processing is being provided by the service process provision device, and the process for which the restart is required is processing that affects execution of the service process being provided by the service process provision device, displaying a restart reporting screen in order to report the restarting, wherein the restarting includes causing the image forming device to restart after display of the restart reporting screen.

11. The image forming method according to claim 9, further comprising:

if the terminal device requests the processing for which the restart is required is requested when the service process relating to image processing is being provided by the service process provision device, and the process for which the restart is required is processing that does nor affect execution of the service process being provided by the service process provision device, displaying a confirmation screen in order to confirm whether or not by restart is permitted, wherein the restarting includes causing the image forming device to restart if the restart is permitted at the confirmation screen.

12. The image forming method according to claim 10, further comprising:

if the terminal device requests the processing for which the restart is required when the service process relating to image processing is being provided by the service process provision device, and the process for which the restart is required is processing that does not affect execution of the service process being provided by the service process provision device, displaying a confirmation screen in order to confirm whether or not the restart is permitted, wherein the restarting includes causing the image forming device to restart if the restart is permitted at the confirmation screen.

13. A non-transitory computer readable medium storing a computer program causing a computer to execute an image forming process for an image forming system including an image forming device; a terminal device connected to the forming device via a communication circuit that requests processing for which a restart of the image forming device is required; a service process provision device connected to the image forming device via the communication circuit that provides a service process relating to image processing to the image forming device, the image forming process comprising:

transmitting a request to execute the service process and data relating to user of the service process to the service process provision server, the data including at least one of billing data and personal data;

restarting the image forming device if processing for which a restart of the image forming device is required is requested by terminal device; and transmitting a request to clear the data to the service process provision server before the image forming device is restarted, if the processing for which the restart is required is requested by the terminal device when a service process relating to the image processing is being provided by the service process provision device connected via communications circuit.

14. The non-transitory computer readable medium according to claim 13, wherein the image forming process further comprises if the terminal device requests the processing for which the restart is required when the service process relating to image processing is being provided by the service process provision device, and the process for which the restart is required is processing that affects execution of the service process being provided by the service process provision device, displaying a restart reporting screen in order to report the restarting, wherein the restarting includes causing the image forming device to restart after display of the restart reporting screen.

15. The non-transitory computer readable medium according to claim 13, wherein the image forming process further comprises if the terminal device requests the processing for which the restart when the service process relating to image processing is being provided by the service process provision device, and the process for which the restart is required is processing that does not affect execution of the service being provided by the service process provision device, displaying a confirmation screen in order to confirm whether or not the restart is permitted, wherein the restarting includes causing the image forming device to restart if the restart is permitted at the confirmation screen.

16. The non-transitory computer readable medium according to claim 14, wherein the image forming process further comprises if the terminal device requests the processing for which the restart is required when the service process relating to image processing is being provided by the service process provision device, and the process for which the restart is required is processing that does not affect execution of the service process being provided by the service process provision device, displaying a confirmation screen in order to confirm whether or not the restart is permitted, wherein the restarting includes causing the image forming device to restart if the restart is permitted at the confirmation screen.

17. The image forming system according to claim 1, wherein the processing for which a restart of the image forming device is required includes a processing of at least one of a setting of restrictions, a settings change, and a settings update.

18. The image forming system according to claim 1, wherein the processing for which a restart of the image forming device is required includes a processing of a settings change, which includes processing for clearing at least one of billing data, and user information.

19. The image forming system according to claim 1, wherein the data relating to use of the service process is user information.

20. The image forming system according to claim 19, wherein the user information includes at least one of billing data, and payment data.

21. The image forming system according to claim 1, wherein in response to the terminal device requesting the processing for which the restart is required when the service process relating to image processing is being provided by the service process provision device, the deletion unit is configured to delete the data relating to use of the service process before the restart process for restarting the image forming device is initiated and before the service process is completed.

22. An image forming system comprising:
an image forming device;
a terminal device configured to be connected to the image forming device via a communication circuit, the terminal device configured to request processing for which restart of the image forming device is required;
a service process provision device configured to be connected to the image forming device via the communication circuit, the service process provision device being configured to provide a service process relating to image processing to the image forming device, wherein
the image forming device includes:
  a transmit unit configured to transmit a request to execute the service process and data relating to use of the service process to the process provision server, the data including billing data;
  a restart unit configured to, in response to the terminal device requesting the processing for which a restart of the image forming device is required, cause the image forming device to restart; and
  a deletion unit configured to, in response to the terminal device requesting the processing for which the restart is required when the service process relating to image processing is being provided by the service process provision device, transmit a bill clear command for clearing the bill data to the service process provision device before the image forming device is restarted.

23. An image forming apparatus including:
a transmit unit configured to transmit a request to execute a service process and data relating to use of the service process to a service process provision server, the data including at least one of billing data and personal data;
a restart unit configured to cause the image forming apparatus to restart in response to a terminal device requesting processing for which a restart of the image forming apparatus is required; and
a deletion unit configured to, and in response to the terminal device requesting the processing for which the restart is required while a service process relating to image processing is being provided by the service process provision device, transmit a request to clear the data to the service process provision server before the image forming apparatus is restarted in order to prevent the data from being transmitted by the communications circuit.

* * * * *